United States Patent
Huggett et al.

(10) Patent No.: US 6,297,977 B1
(45) Date of Patent: Oct. 2, 2001

(54) PARALLEL OPERATION OF MULTIPLE GENERATORS

(75) Inventors: Colin E. Huggett, Torrance; David C. Lewis, Hermosa Beach, both of CA (US)

(73) Assignee: Honeywell Power Systems Inc., Albuquerque, NM (US)

(*) Notice: Subject to any disclaimer, the term of this patent is extended or adjusted under 35 U.S.C. 154(b) by 0 days.

(21) Appl. No.: 09/659,631

(22) Filed: Sep. 12, 2000

(51) Int. Cl.[7] .................................................. H02M 3/335
(52) U.S. Cl. .................................. 363/65; 363/16; 363/95
(58) Field of Search .................................. 363/16, 95, 65, 363/71

(56) References Cited

U.S. PATENT DOCUMENTS

| 4,532,761 | 8/1985 | Takaoka et al. . |
| 4,754,607 | 7/1988 | Mackay . |
| 5,325,042 | 6/1994 | Murugan . |
| 5,629,844 | * 5/1997 | Krichtafovitch et al. ............. 363/65 |
| 5,903,116 | 5/1999 | Geis et al. . |
| 6,020,713 | 2/2000 | Geis et al. . |
| 6,023,135 | 2/2000 | Gilbreth et al. . |
| 6,031,294 | 2/2000 | Geis et al. . |
| 6,128,204 | * 10/2000 | Munro et al. .......................... 363/41 |
| 6,169,334 | 1/2001 | Edelman . |
| 6,169,390 | * 1/2001 | Jungreis .................................. 322/4 |
| 6,175,210 | * 1/2001 | Schwartz et al. ..................... 318/801 |

FOREIGN PATENT DOCUMENTS

| 0535382A1 | 4/1993 | (EP) . |
| 0901218A2 | 3/1999 | (EP) . |
| 0998005A1 | 5/2000 | (EP) . |

* cited by examiner

Primary Examiner—Adolf Deneke Berhane
(74) Attorney, Agent, or Firm—Hugh Gortler; Ephraim Starr

(57) ABSTRACT

A power generation system includes multiple generators that are operated in parallel. An inverter of one of the generators is always operated in voltage mode. Inverters of the other generators are switched between voltage and current modes.

21 Claims, 3 Drawing Sheets

PARALLEL OPERATION OF MULTIPLE GENERATORS

BACKGROUND OF THE INVENTION

The present invention relates to power generating systems. More specifically, the present invention relates to parallel operation of multiple electrical power generators.

The United States Electric Power Research Institute (EPRI), which is the uniform research facility for domestic electric utilities, predicts that up to 40% of all new electric power generation could be provided by distributed generators by the year 2006. In many parts of the world, the lack of electric infrastructure (transmission and distribution lines) will greatly expedite the commercialization of distributed generation technologies since central plants not only cost more per kilowatt, but also must have expensive infrastructure installed to deliver electricity to consumers.

Small, multi-fuel, modular distributed microturbine generators could help alleviate current afternoon "brownouts" and "blackouts" prevalent in many parts of the world. A simple, single moving part concept would allow for low technical skill maintenance, and low overall cost would allow for wide spread purchase in those parts of the world where capital is sparse. In addition, given the United States emphasis on electric deregulation and the world trend in this direction, consumers of electricity would have not only the right to choose the correct method of electric service but also the right to choose a cost effective service.

A single microturbine generator, on-site at a point of use, might not be able to satisfy customer demand. However, the customer demand could be satisfied by operating multiple microturbine generators in parallel and combining their outputs. For instance, ten generators, each capable of providing a maximum of 75 kW of power, could be operated in parallel to provide 750 kW of power.

Customer demand usually varies over the course of a day. Peak power is usually demanded only for limited periods of time. During these periods of peak power demand, all of the microturbine generators could be operated in parallel, with each microturbine generator providing maximum power output. When peak power is not demanded, however, two or more microturbine generators could perform load sharing to satisfy the power demand.

However, load sharing can result in inefficient utilization of the microturbine generators. Inefficient load sharing can increase the cost of electricity. Conversely, efficient load sharing can reduce the cost of electricity.

There is a need for efficient load-sharing when peak power is not demanded.

DETAILED DESCRIPTION OF THE INVENTION

Figure 1:
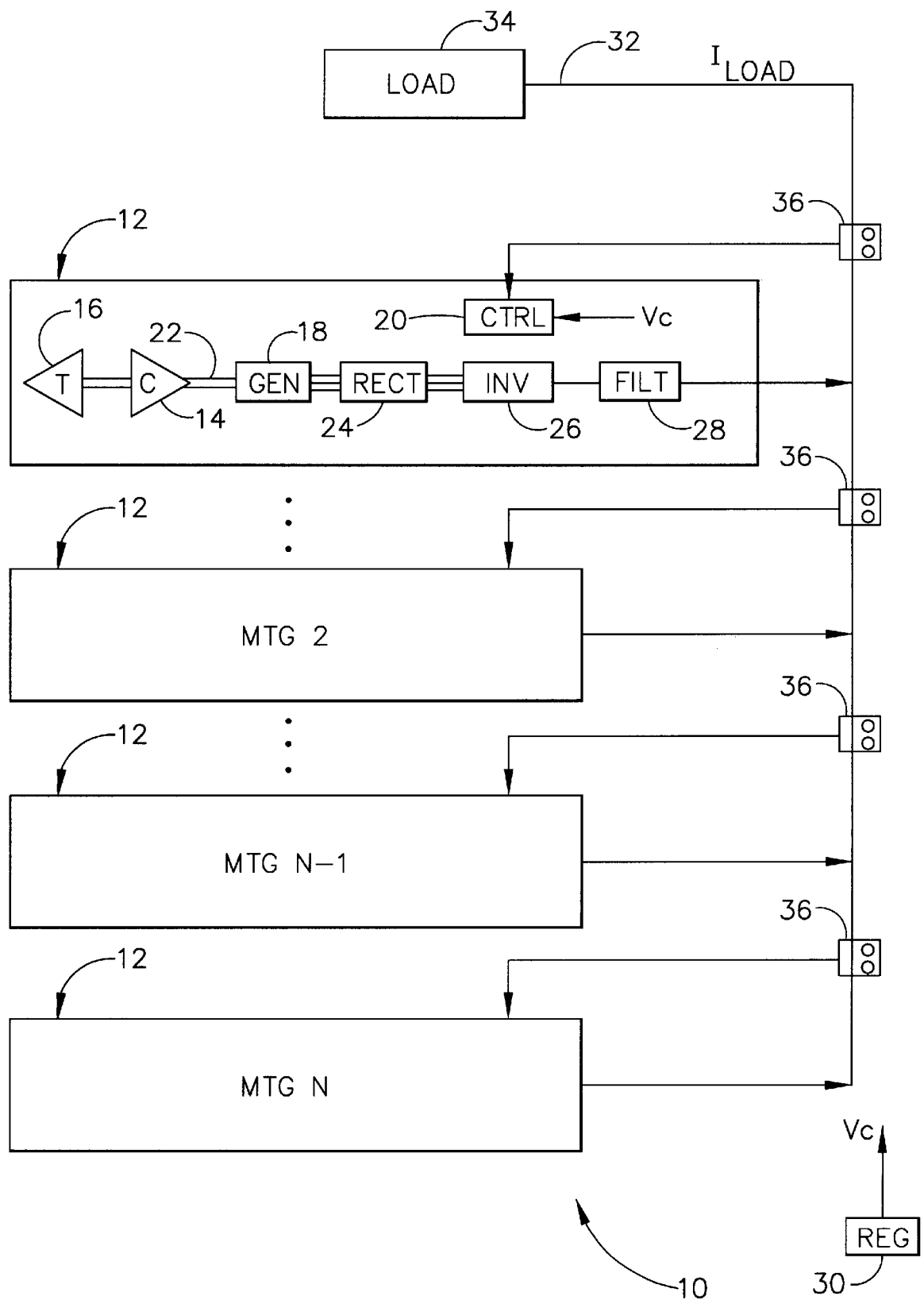
FIG. 1 is an illustration of a power generating system according to the present invention, the system including multiple microturbine generators.

Referring to FIG. 1, a power generation system 10 includes a number N of microturbine generators 12, where integer N≧2. Each microturbine generator 12 includes a compressor 14, a turbine 16, an integrated electrical generator 18 and a controller 20. The compressor 14, the turbine 16 and the electrical generator 18 may be rotated by a single common shaft 22.

During operation of a microturbine generator 12, air enters an inlet of the compressor 14 and is compressed. Compressed air leaving an outlet of the compressor 14 is circulated through cold side air passages in a recuperator (not shown). Inside the recuperator, the compressed air absorbs heat from the turbine exhaust. The heated, compressed air leaving the cold side of the recuperator is supplied to a combustor (not shown). A gaseous or liquid fuel is also supplied to the combustor. Within the combustor the fuel and compressed air are mixed and ignited. Hot, expanding gases resulting from combustion are expanded through the turbine 16, thereby creating turbine power. The turbine power, in turn, drives the compressor 14 and the electrical generator 18.

The generator 18 may be a ring-wound, two-pole toothless (TPTL) brushless permanent magnet machine having a permanent magnet rotor and stator windings (although other types of machines may be used). The rotor is attached to the shaft 22. When the rotor is rotated, an alternating voltage is induced in the stator windings.

The controller 20 controls turbine speed by controlling the amount of fuel flowing to the combustor. Speed of the turbine may be varied in accordance with external energy demands placed on the power generation system 10.

Variations in the turbine speed will produce a variation in the frequency of the alternating current generated by the electrical generator 18. However, the variable-frequency ac power is rectified to dc power by a rectifier 24, and the dc power is converted to fixed frequency ac power by a solid-state electronic inverter 26. The controller 20 generates pulse width modulated commutation commands that cause the inverter 26 to convert the dc power to ac power.

The controller 20 may operate the inverter 26 in either a voltage mode or a current mode. The voltage mode involves closed loop control of the inverter 26 by varying pulse width in response to changes in the output voltage. In contrast, the current mode involves single or dual loop control of the inverter 26 by adjusting the pulse width in response to measured output current and output voltage. Since output current is measured and controlled, the current mode allows the microturbine generator 12 to operate as a current source.

Figure 2:
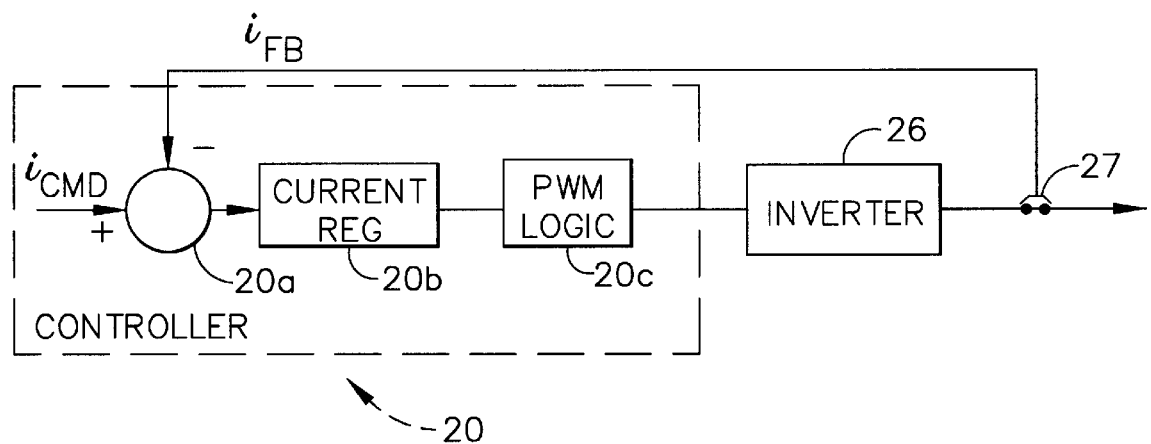
FIG. 2 is an illustration of an inverter being operated in a current mode.

Reference is made briefly to FIG. 2, which illustrates a current mode of operation for the inverter 26. Current sensors 27 sense currents ($i_{FB}$) at an output of the inverter 26. A summing junction 20a generates an error signal from the sensed current ($i_{FB}$) and a current command ($i_{CMD}$). The error signal is regulated by a current regulator 20b, which commands pulse width modulation logic 20c to adjust the pulse width in response to changes in the sensed current ($i_{FB}$). The current command ($i_{CMD}$) may be generated by another loop of the controller 20.

Returning to FIG. 1, an output of the inverter 26 is filtered by a filter 28 to remove high frequency components caused by the pulse width modulation of the inverter 26. The filter 28 may be an inductor/capacitor type.

Filtered power outputs of the microturbine generators 12 are connected to a distribution feeder line 32. Each microturbine generator 12 supplies ac power to the distribution feeder line 32 via its power output.

A plurality of loads may be connected to the distribution feeder line 32. A line current $I_{LOAD}$ represents the total current drawn by the loads that are connected to the distribution feeder line 32. The plurality of loads are represented by a single block 34.

The line current $I_{LOAD}$ and, therefore, the total power drawn by the load 34 can vary during the course of a day. The total power is usually higher during business hours and lower during late night. However, the actual power drawn will depend upon customer usage.

The microturbine generators 12 may be operated in parallel to supply power to the load 34. If all N microturbine generators 12 are operating at maximum power-generating capacity and each microturbine generator 12 has a maximum capacity of P kW, the system 10 can provide maximum power of N×P kW to the load 34.

Figure 3:
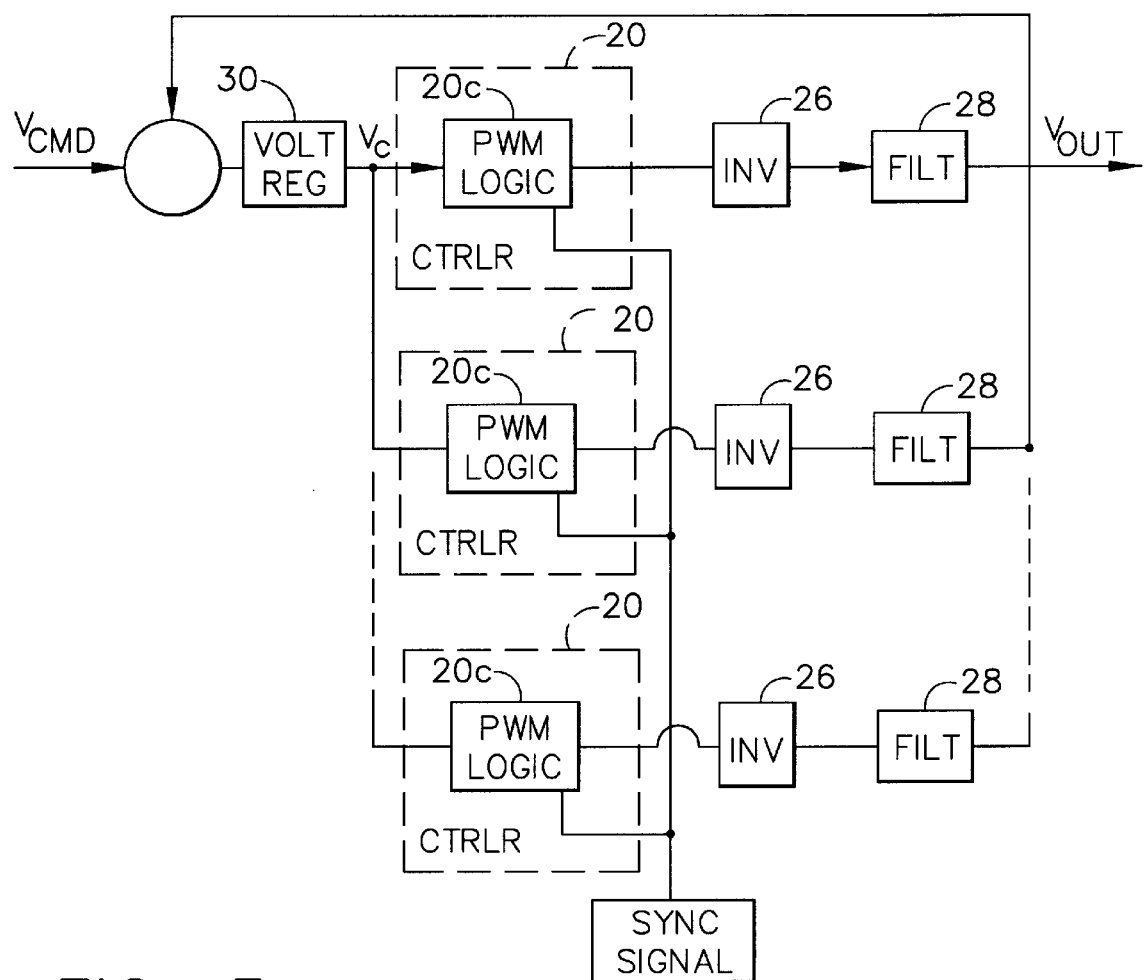
FIG. 3 is an illustration of multiple inverters being operated in a voltage mode.

Additional reference is made to FIG. 3. One approach of operating multiple microturbine generators 12 in parallel is to phase-lock each of the inverters 26 to a master oscillator. A synchronization signal (e.g., a 60 Hz signal) may be sent to each of the inverters 26, such that each inverter 26 will phaselock onto the synchronization signal, ensuring that the voltage produced by each inverter 26 is exactly in-phase with the inverters 26 of the other microturbine generators 12.

To control the amplitude of the output voltage, a voltage regulator 30 sends a common voltage command Vc to the pulse width modulation logic 20c of each controller 20, which regulates the fundamental of the inverter output voltage prior to filtering by the filter 28. With each inverter 26 receiving the same voltage command and being synchronized to the same synchronization signal, both real and reactive power are shared.

To implement this approach, one of the microturbine generators 12 may be designated as a "master" which always operates its inverter in the voltage mode. The filtered output of the master inverter 26 is used as a reference signal by all inverters 26 being operated in the current mode. A second microturbine generator 12 may be designated as a slave. The slave is always operated in the voltage mode. In the event the master fails, the slave takes over to prevent a loss of power. Thus, the slave provides a measure of redundancy.

The remaining microturbine generators 12 are designated as followers. Signals on the power outputs of the followers are phase-locked with the reference signal, and a voltage regulator commands all microturbine generators 12 to produce synthesized ac voltage waveforms of the same amplitude. Thus, real and reactive power are controlled.

When the load 34 does not draw maximum power, cost-effective operation of the system 10 may be achieved by switching selected inverters 26 of the followers between the voltage mode and the current mode. In general, the goal is to operate as many followers as possible in current mode at maximum power output without exceeding the power demanded by the load 34. The balance of the load is shared by the microturbine generators 12 operating their inverters 26 in the voltage mode.

When the power delivered to the load 34 is below the full power capacity of a single microturbine generator 12, the inverters 26 of all of the microturbine generators 12 are operated in a voltage phase-locked mode. Thus, each microturbine generator 12 supplies a current of $I_{LOAD}/N$.

When the power delivered to the load 34 is just above the full power capacity of a single microturbine generator 12, one of the followers operates its inverter 26 in the current mode and the remaining microturbine generators 12 operate their inverters 26 in the voltage mode. A current of $I_{MAX}$ is supplied by the follower operating its inverter 26 in the current mode (where $I_{MAX}$ is equal to the ratio of maximum power capacity and line voltage), and the balance of the current ($I_{LOAD}-I_{MAX}$) is supplied by the microturbine generators 12 operating their inverters 26 in the voltage mode. Thus, the one microturbine generator 12 is operating at maximum load—its most efficient point—while the other microturbine generators 12 are idle or close thereto. This represents the most economical operating point of the system 10 for the load 34.

When the power delivered to the load 34 is just above the full power capacity of two microturbine generators 12, two followers operate their inverters 26 in the current mode while the other microturbine generators are at idle or close thereto. A current of $_1$MAX is supplied by each follower operating its inverter in the current mode, and the balance of the current ($I_{LOAD}-2I_{MAX}$) is supplied by the microturbine generators 12 operating their inverters 26 in the voltage mode.

When the delivered power reaches maximum power-generating capacity of the system 10, all of the followers operate their inverters 26 in the current mode. Only the master and slave operate their inverters 26 in the voltage mode.

More generally, if demanded power exceeds the maximum power-generating capacity of k followers, where $1 \leq k \leq (N-2)$, then k followers operate their inverters 26 in the current mode. The remaining microturbine generators 12 operate their inverters 26 in the voltage mode.

Consider a system 10 including N=10 microturbine generators 12, with each microturbine generator 12 having a maximum power capacity of 75 kW. When the load 34 demands 190 kw of power, two microturbine generators 12 operate their inverters 26 in the current mode and supply 150 kW of power, while the remaining eight microturbine generators 12 operate their inverters 26 in the voltage mode and each supply 40/8=5 kW of power. When the load 34 is increased to 295 kW, a third microturbine generator 12 is switched from voltage mode control to current mode control. As a result, three microturbine generators 12 provide 225 kW of power and the remaining seven microturbine generators 12 each provide 70/7=10 kW of power. If the load 34 is suddenly dropped to 120 kW, two of the microturbine generators 12 are switched back to voltage mode control.

Current sensors 36 are provided to determine whether the followers should be operating their inverters 26 in the voltage mode or the current mode. Each current sensor 36 may be coupled between the distribution line 32 and an output of a follower. Each current sensor 36 may include a current sensing element and a comparator. When sensed current exceeds a first threshold, the comparator notifies a controller 20 to switch inverter modes from voltage mode to current mode. While the sensed current is above the first threshold, the inverter mode remains in current mode. When sensed current drops below a second threshold, the comparator notifies the controller 20 to switch inverter modes from current mode to voltage mode. While the sensed current is below the second threshold, the inverter mode remains in voltage mode.

The first and second thresholds for each follower may be different. For example, the first follower might have a first threshold (T11) of 1.2 $I_{MAX}$ and a second threshold (T12) of 1.1 $I_{MAX}$. Adding such a hysteresis (e.g., transitioning to current mode when sensed current is greater than 1.2 $I_{MAX}$ and transitioning from current mode to voltage mode when sensed current is less than 1.1 $I_{MAX}$) precludes a follower from oscillating between current and voltage mode.

The current sensors 36 may be cascaded. The first current sensor 36 provides information to the controller 20 of the first follower, the second current sensor 36 provides information to the controller 20 of the second follower, and the $j^{th}$ current sensor 36 provides information to the $j^{th}$ follower.

When the sensors 36 are cascaded, each sensor 36 senses a current equal to the line current ($I_{LOAD}$) less the maximum currents supplied by the higher-ordered generators 12. For example, in a system having N=4 generators 12, the first current sensor 36 senses a current I10=$I_{LOAD}$, and the second current sensor 112 senses a current I20=$I_{LOAD\ (N-1)}$N=0.75 $I_{LOAD}$ (sensors for the slave and master are optional, since the slave and master always operate their inverters 26 in the voltage mode).

Cascading the sensors 36 allows the followers to be switched in the following hierarchy: the first follower is the first to be switched from the voltage mode to the current mode and the last to be switched from the current mode to the voltage mode. The second follower is the second to be switched from the voltage mode to the current mode and the second-to-last to be switched from the current mode to the voltage mode. The $j^{th}$ follower is the $j^{th}$ to be switched from the voltage mode to the current mode and the $j^{th}$-from-last to be switched from the current mode to the voltage mode.

When the sensors 36 are cascaded as shown in FIG. 1, no information for switching modes needs to be transferred between controllers 20. Each sensor 36 provides each controller 20 with sufficient information to switch modes.

Figure 4:
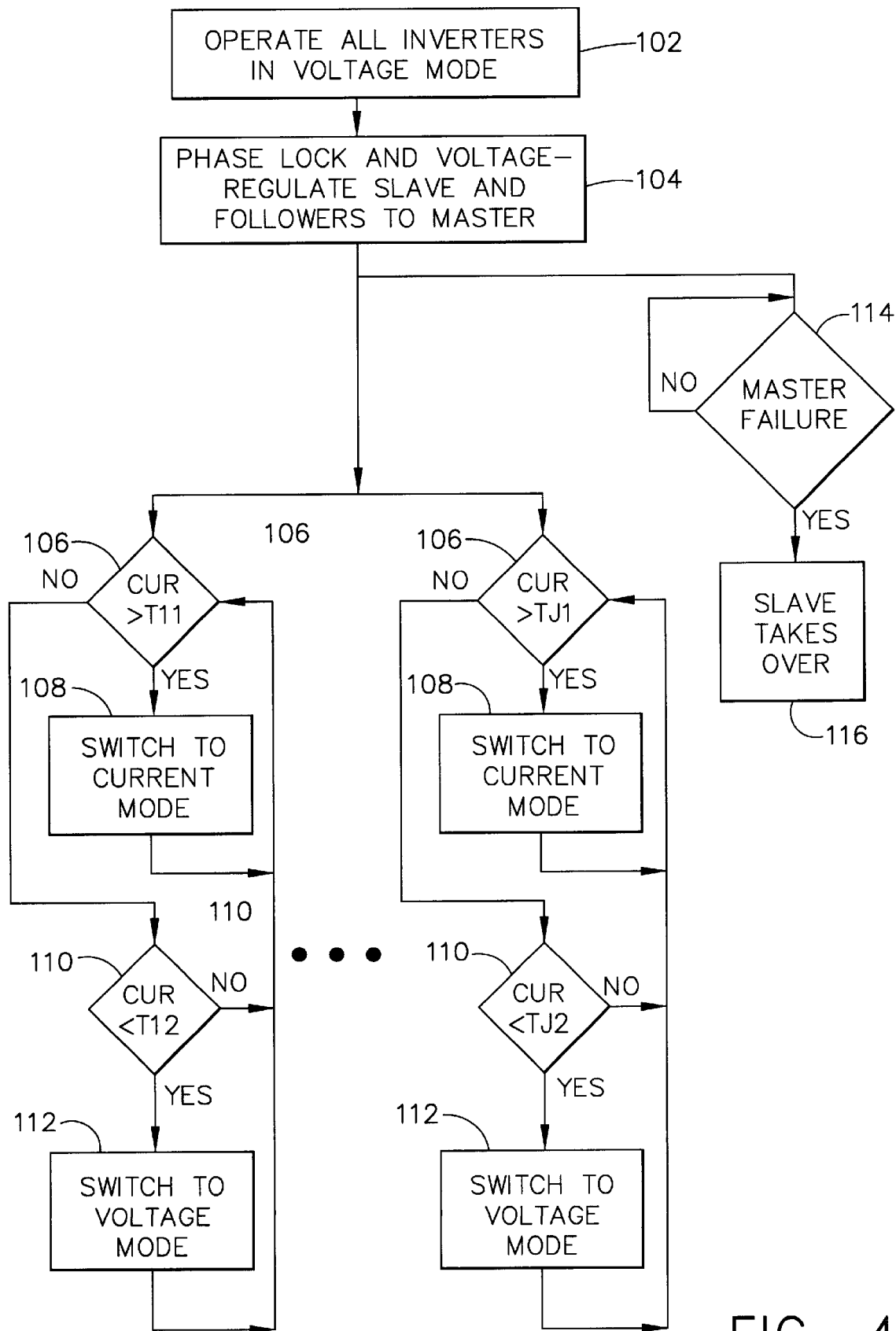
FIG. 4 is a flowchart of a method of operating the microturbine generators in parallel.

Reference is now made to FIG. 4, which shows a method of operating the microturbine generators 12 in parallel. Initially, the inverters of all N microturbine generators 12 are operated in the voltage mode (block 102). The $N^{th}$ microturbine generator is designated as the master, whereby the power outputs of the remaining microturbine generators are phase locked and regulated according to the output of the master (block 104).

The current sensor 36 of each follower compares line current to a first threshold (block 106). Thus, the current sensor of the first follower senses line current and compares the sensed current to a threshold (T11). If the line current is greater than the threshold (T11), the first follower is switched to current mode control and operated at maximum power output (block 108).

The current sensor 36 of the $j^{th}$ follower (where 2≦j≦ (N-2)) senses the line current (block 106) and compares the sensed line current to a threshold (TJ1). If the sensed current is greater than the threshold (TJ1), the $j^{th}$ follower is switched to current mode control and operated at maximum power output (block 108).

The thresholds (T11, . . . , TJ1) are selected so that maximum power demand is not exceeded. Moreover, if the sensors 36 are cascaded and the load gradually ramps up from 0 kW to maximum, the followers will be switched from voltage mode control to current mode control in the following sequence order: first follower, . . . $j^{th}$ follower.

Each current sensor 36 also compares the sensed current to a second threshold (block 110). If the sensed current falls below the second threshold, the corresponding microturbine generator 12 is switched from the current mode control to the voltage mode control (block 112). The first follower compares the sensed current to a second threshold (T12), the second follower compares the sensed current to a second threshold (T22), and the $j^{th}$ follower compares the sensed current to a second threshold (TJ2).

The second thresholds (T12, T22, TJ2) are selected so that the maximum number of followers are operated at full power without exceeding the demanded power. If the sensors 36 are cascaded and the load gradually ramps down from maximum to 0 kW, the followers will be switched from current mode control to voltage mode control in the following sequence order: $j^{th}$ follower, . . . , first follower, If the sensed current is above the first threshold (block 106) and a microturbine generator is already in the current mode, that microturbine generator remains in the current mode (block 108). If the sensed current is below the second threshold (block 110) and a microturbine generator is already in the voltage mode, that microturbine generator remains in the voltage mode (block 112).

If the master fails at any time (block 114), the slave takes over as the master (block 116). Consequently, the outputs of the followers are phase-locked and regulated according to the output of the new master.

The method will be described in connection with an exemplary system having N=4 microturbine generators. The first and second microturbine generators are designated as the followers, the third microturbine generator is designated as the slave, and the fourth microturbine generator is designated as the master. The current sensors 36 are cascaded.

The method will now be described in connection with a scenario in which the load starts at zero and increases slowly. At the start the line current $I_{LOAD}$=0, and all four microturbine generators 12 operate their inverters 26 in the voltage mode.

As the load begins to increase slowly, all four microturbine generators 12 share the load equally. Thus, each microturbine generator 12 provides a current of $I_{LOAD}$/N.

The first microturbine generator 12 transitions to the current mode when $I_{LOAD}$>1.2 $I_{MAX}$ and begins generating power at maximum capacity. When the transition occurs, a drop occurs in the load shared by the remaining three microturbine generators 12, which are still operating their inverters in the voltage mode.

The second microturbine generator 12 transitions to the current mode and operates at maximum power-generating capacity when the current I21>1.2 $I_{MAX}$. After the transition, the balance of the load is shared by the third and fourth microturbine generators 12, which are still operating their inverters in the voltage mode.

When the load is reduced, the line current $I_{LOAD}$ is also reduced. Once the sensed current I21<1.1 $I_{MAX}$, the second microturbine generator 12 transitions from current mode control back to the voltage mode control. Once the line current $I_{LOAD}$<1.1 $I_{MAX}$, the first microturbine generator 12 transitions from current mode control to the voltage mode control.

The inverter of the fourth microturbine generator 12 is always operated in the voltage current mode. If the fourth microturbine generator 12 becomes disabled, the third microturbine generator 12 is operated in the voltage mode as the master.

Thus disclosed is a power generation system 10 in which a maximum number of microturbine generators 12 are maintained at their most efficient operating point, thereby satisfying local demand and operating at maximum efficiency.

The system 10 uses a simple method of switching inverters 26 between current mode and voltage mode. The system 10 avoids problems that could occur if a sufficient number of inverters 26 do not revert to voltage mode when the load 34 is suddenly reduced. Such problems include a loss of control of the distribution line, which can cause a complete loss of power. Moreover, each microturbine generator 12 determines the correct mode of inverter operation.

Some of the generators may be shut down or operated in stand-by mode while other "active" generators are generating power. Only the active generators would provide power.

The system is not limited to microturbine generators. The system may include any type of prime mover having an inverter that is operable between voltage and current modes.

The system is not limited to prime movers having the same power-generating capacity. Prime movers having different power-generating capacities may be used.

The present invention is not limited to the specific embodiments described above. Instead, the present invention is construed according to the claims that follow.

What is claimed is:

1. A power generating system comprising:
    a group of generators, each generator including an inverter that is operable in a voltage mode and a current mode; and
    a control system for switching at least one inverter between a current mode and a voltage mode, the control system switching between the two modes in response to a change in demanded power.

2. The system of claim 1, wherein each generator is part of a microturbine generator.

3. The system of claim 1, wherein at least one of the generators is designated as a follower; wherein the control system operates a maximum number of follower inverters in current mode at maximum power output without exceeding the demanded power; and wherein the control system operates the remaining inverters of active generators in voltage mode.

4. The system of claim 3, wherein the control system uses a synchronization signal to phase-lock the inverters of the followers.

5. The system of claim 4, wherein one of the generators is designated as a master; wherein the synchronization signal is provided by the master; and wherein the inverter of the master is always operated in voltage mode.

6. The system of claim 5, wherein one of the generators is designated as a slave, the slave providing the synchronization signal if the master fails; and wherein the slave is always operated in voltage mode.

7. The system of claim 5, further comprising a plurality of sensors for determining when the inverters should be switched between current and voltage modes, the sensors being cascaded.

8. The system of claim 1, further comprising a voltage regulator for sending the same voltage command to each inverter.

9. The system of claim 1, wherein the control system operates all of the inverters in voltage mode when demanded power is below the full power-generating capacity of a single generator.

10. The system of claim 1, further comprising at least one current sensor for comparing line current to first and second thresholds; wherein a corresponding inverter is switched from voltage mode to current mode when the first threshold is crossed; wherein the corresponding inverter is switched from current mode to voltage mode when the second threshold is crossed; and wherein the first and second thresholds are not equal.

11. The system of claim 1, further comprising a plurality of sensors for determining when the inverters should be switched between current and voltage modes, the sensors being cascaded.

12. The method of claim 11, wherein each sensor corresponds to an inverter; and wherein each inverter is switched solely on information provided by its corresponding sensor.

13. The system of claim 1, wherein the inverters are switched according to a hierarchy.

14. A method of using a set of generators to supply a power demand, the generators having inverters, the method comprising the steps of:
    operating as many generators as possible at maximum power output without exceeding demanded power, wherein the inverters of the generators providing maximum power output are operated in current mode; and
    operating inverters of the remaining generators in voltage mode.

15. The method of claim 14, further comprising the step of switching selected inverters between the current and voltage modes in response to changes in the power demand.

16. The method of claim 14, further comprising the step of supplying a reference signal to the generators, and phase-locking outputs of the inverters to the reference signal.

17. The method of claim 14, further comprising the step of sending the same voltage command to each of the inverters.

18. The method of claim 14, wherein the generators supply power to a distribution line; wherein at least one generator inverter is switched from voltage mode to current mode when line current crosses a first threshold; and wherein the at least one generator inverter is switched from current mode to voltage mode when line current crosses a second threshold, the first and second thresholds being different.

19. The method of claim 14, further comprising the step of sensing line current at the output of each generator; and wherein each inverter is switched solely according to sensed current on the output of the corresponding generator.

20. The method of claim 14, wherein the generator inverters are independently switched according to a hierarchy.

21. A method of using a group of microturbine generators to supply current to a load, the method comprising the steps of:
    operating one of the microturbine generators in the group as a master, the master always being operated in a voltage mode;
    operating other microturbine generators in the group as followers;
    combining power outputs of the master and the followers; and
    switching a follower from voltage mode to current mode when load balance is greater than that follower's maximum power rating, the follower then being operated in current mode at maximum power output.

* * * * *